Patented July 5, 1932

1,866,287

UNITED STATES PATENT OFFICE

WILLIAM A. BLUME, OF DETROIT, MICHIGAN, ASSIGNOR TO AMERICAN BRAKE MATERIALS CORPORATION, OF NEW YORK, N. Y., A CORPORATION OF NEW YORK

FRICTION ELEMENTS AND METHOD OF MAKING

No Drawing. Application filed October 2, 1929. Serial No. 396,936.

This invention relates to friction elements and the method of making same and it constitutes an improvement on the invention disclosed in Letters Patent No. 1,761,318, and the division thereof, No. 1,761,057, granted June 3, 1930. The composition of said patents comprises a mixture of a natural pyrobituminous material, asbestos and a binder, and it is adapted to be molded in a press in desired sizes and shapes to serve as a friction element for brakes, clutches and other mechanical devices. The friction element made of this composition is solid, hard and compact and while it can be satisfactorily molded in a press in thick or thin shapes of desired sizes it is difficult to produce in strip or continuous form because the material lacks tensile strength and flexibility. The friction elements are made in arcuate or other shapes complementary to the supports upon which they are mounted and it is desirable that they should have some flexibility to facilitate the manufacture and installation of the elements and to avoid the necessity for pre-shaping the elements accurately to fit particular supports. Also it is desirable to be able to mold the material in elongated or continuous strips for some purposes and this presents difficulties with a material which has no tensile strength or flexibility.

The object of my invention is to provide a novel composition friction element which has all the desirable qualities of the composition of the application aforesaid and in addition thereto has sufficient tensile strength and flexibility to enable it to be fitted to a support without breaking or otherwise damaging the element.

Another object of the invention is to provide a novel composition which can be molded in strip form by a rolling operation and cured without pressure to produce a friction element conforming generally to the shape of the support on which it is to be mounted but having sufficient tensile strength and flexibility to enable it to be fitted snugly to the support.

In the practice of my invention I introduce a small quantity of rubber in the composition mixture of asbestos, finely divided natural pyrobituminous material, and a binder, mold the composition to suitable sizes and shapes, and cure the shapes in an oven by heat without pressure.

In practice I provide 50% to 75% by weight of short fiber asbestos and 12% to 20% by weight of finely divided natural pyrobituminous material such as bituminous coal and thoroughly mix the same to form a base mixture. I also take 8% to 15% by weight of a drying oil, preferably double boiled linseed oil, and 12% to 30% by weight of a hard rubber cement, and stir into an emulsion to form the bond mixture of my composition. This bond mixture is added to the base mixture of asbestos and coal and is stirred or agitated in a dough mixer until the bond is thoroughly worked into the base. The composition can then be molded into a continuous strip and cut into liner lengths which are then placed upon forms for curing. These forms are curved to correspond substantially with the curvature of the supports for which the liners are being made, but the liners have sufficient flexibility so that accuracy of curvature is not an essential. The molded liners are limp and will shape themselves to the curvature of the form or they can easily be pressed to shape as required and held in place on the forms by suitable retaining means. The strip liners are preferably molded on a flexible backing, such as reticulated metal or cloth, between rolls in a rolling machine.

After the strip liners are formed, as described, they are placed in an oven for curing and subjected to a temperature of from 125° F. to 200° F. for a sufficient length of time, depending upon thickness, to drive off the volatile matter, and then the temperature is stepped up to 250° F. to 350° F. and maintained until the curing is complete. This curing operation is conducted without pressure and may continue from eight to fifteen hours.

I may use any equivalents for the materials specified and vary the proportions and the curing operation as may be found desirable to produce a friction element in any desired size or shape and for any use within the scope of my invention. A typical formula of commercial hard rubber cement that may be used is sulphur one part, gum rubber three parts, alcohol six parts, and carbon disulphide one hundred parts.

My invention provides a wear-resisting friction element which is particularly useful in brakes and clutches and which may be used for many other purposes. It is solid and hard, but not rigid, and it has a certain amount of flexibility enabling it to be easily fitted to curved or other surfaces for which it is adapted without liability of fracturing the body, which would tend to promote disintegration and lessen its life and efficiency. As herein indicated, the invention is especially important in making friction elements in continuous lengths which can be cured and cut to lengths or cut to lengths and cured thereby greatly expediting and reducing the cost of manufacture. The composition is also desirable in the manufacture of blocks in a molding press because of the additional quantity of tensile strength which is imparted to the block. To some extent the quantity of flexibility is also of importance in the block form of the friction element. Furthermore, it is found that the composition containing the rubber ingredient flows better in the molding operation than the composition without the rubber ingredient and this is another desirable quality of the present invention.

I claim:

1. A friction element consisting of a solid compressed mixture of asbestos, finely divided natural pyrobituminous material, and a binder including a hard rubber cement and a drying vegetable oil.

2. A friction element consisting of a solid compressed mixture of asbestos, finely divided natural pyrobituminous material, and a binder including a hard rubber cement and linseed oil.

3. The herein described method of making a friction element which consists in preparing a base including a mixture of asbestos and finely divided natural pyrobituminous material, preparing as a binder an emulsion of hard rubber cement and linseed oil, then thoroughly mixing the base and binder and forming this mixture into shapes, and then curing the shapes by heat without pressure.

4. The herein described method of making a friction element which consists in mixing 50% to 75% by weight of short fiber asbestos and 12% to 20% by weight of finely divided natural pyrobituminous material to form a base, mixing 12% to 30% by weight of softened hard rubber compound cement with 8% to 15% by weight of linseed oil to form a binder, thoroughly mixing the base and the binder, forming this mixture into shapes, and curing the shapes by heat without pressure.

WILLIAM A. BLUME.